United States Patent
Fishel et al.

[11] Patent Number: 5,860,255
[45] Date of Patent: Jan. 19, 1999

[54] MASONRY-BONDABLE, WATER-RESISTANT FLEXIBLE MEMBRANE

[75] Inventors: David L. Fishel, Caledonia; Terry M. DiGiglia, Columbus, both of Miss.

[73] Assignee: GenCorp Inc., Fairlawn, Ohio

[21] Appl. No.: 647,334

[22] Filed: May 9, 1996

[51] Int. Cl.$^6$ .................................................... E02D 17/00
[52] U.S. Cl. .................... 52/169.14; 156/71; 442/396
[58] Field of Search .................... 52/35, 169.14, 52/393, 394, 741.4, 746.1; 312/245; 156/71; 442/396

[56] References Cited

U.S. PATENT DOCUMENTS

| | | |
|---|---|---|
| 3,641,216 | 2/1972 | Schnebelen et al. . |
| 3,646,180 | 2/1972 | Winnick . |
| 3,654,109 | 4/1972 | Cusick ..................................... 156/285 |
| 3,663,350 | 5/1972 | Stokes . |
| 4,103,061 | 7/1978 | Chomes . |
| 4,603,074 | 7/1986 | Pate et al. . |
| 4,935,281 | 6/1990 | Tolbert et al. . |
| 4,950,500 | 8/1990 | Kauffman et al. ....................... 427/197 |
| 5,124,191 | 6/1992 | Seksaria ............................ 52/789.1 X |
| 5,318,832 | 6/1994 | Fishel et al. . |
| 5,481,838 | 1/1996 | Fishel et al. . |

FOREIGN PATENT DOCUMENTS

| | | |
|---|---|---|
| 849775 | 6/1995 | Belgium . |
| 1 252 380 | 4/1989 | Canada . |
| 0 252 434 | 1/1988 | European Pat. Off. . |
| 93 30 8714 | 2/1994 | European Pat. Off. . |
| 2 298 432 | 1/1975 | France . |
| 1 149 002 | 3/1966 | United Kingdom . |
| 2 115 741 | 9/1983 | United Kingdom . |

OTHER PUBLICATIONS

A copy of an IDS dated Jan. 5, 1993.

Primary Examiner—Christopher Kent
Assistant Examiner—Timothy B. Kang
Attorney, Agent, or Firm—Robert F. Rywalski; Daniel J. Hudak

[57] ABSTRACT

An anti-fracture, water-resistant, masonry-bondable membrane comprises a laminate having a core generally containing at least two plies of a flexible material bonded together by a flexible adhesive such as a plastisol, and a non-woven fiber layer physically bonded directly to at least one side of the core. The plastisol is a liquid composition which contains small sized resin particles such as polyvinyl chloride dispersed within a plasticizer. The core has good low as well as high temperature peel strength. The non-woven fiber layer is physically bonded to the flexible core by heat and pressure to produce a laminate wherein the non-woven fibers are partially embedded within the flexible material. The flexible membrane or laminate when utilized between and bonded to an exterior masonry article such as ceramic tile and to a substrate such as concrete, is very effective in preventing any cracks from propagating from the substrate to the article.

18 Claims, 1 Drawing Sheet

MASONRY-BONDABLE, WATER-RESISTANT FLEXIBLE MEMBRANE

FIELD OF THE INVENTION

The present invention relates to a masonry-bondable membrane generally having a flexible core of at least two plies of a flexible material such as polyvinyl chloride bonded together with a plastisol adhesive. Desirably, each side of the core is physically bonded to a non-woven fiber layer.

BACKGROUND OF THE INVENTION

Heretofore, a membrane has been utilized between an exterior masonry article such as ceramic tile or marble and a masonry substrate such as concrete or stone to form a water-resistant barrier as well as a flexible layer which prevents cracks in the substrate from propagating into the article. A particular membrane contained an exterior, non-woven fiber material which was chemically bonded to each side of a polyvinyl chloride intermediate layer by an adhesive. Such a laminate had poor hydrostatic water resistance and generally poor bondability to masonry bonding materials such as mortar or cement. Delamination would thus readily occur between the membrane and the masonry bonding material. Another membrane which was utilized is set forth in U.S. Pat. Nos. 5,318,832 and 5,481,838, wherein two plies of a flexible, fused central layer were physically bonded to a non-woven, fiber material. However, this membrane had poor low temperature peel strength between the two plies.

SUMMARY OF THE INVENTION

A flexible, masonry bondable, anti-fracture, water-resistant laminate comprises a core of at least two plies of a flexible material bonded together by a flexible liquid adhesive. Generally, each side of the core is physically bonded directly to a non-woven fiber layer through the application of heat and pressure. Due to the existence of the non-woven fiber layer being partially embedded within the flexible layer, a good mechanical bond is formed with a masonry bonding material such as mortar or cement. The laminate or membrane forms an effective water-resistant, antifracture layer when utilized between a masonry substrate and an exterior masonry article such as a ceramic tile.

DETAILED DESCRIPTION OF THE INVENTION

Figure 1:
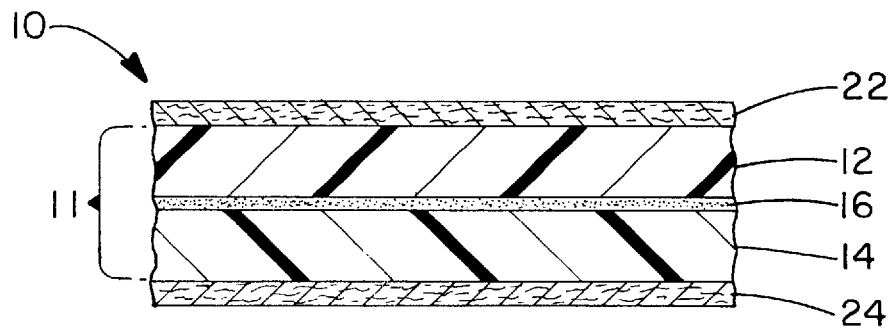
FIG. 1 is a cross-sectional view of a membrane of the present invention wherein a plastisol adhesive adheres together two layers of a flexible material each of which is physically bonded to a non-woven fiber layer.

The membrane of the present invention is shown in FIG. 1 wherein like reference characters indicate like parts. The membrane, generally indicated by the numeral 10, is a laminate usually containing a flexible top layer 12 in the form of a sheet or a film and a flexible bottom layer 14 which can also be a sheet or film. Layers 12 and 14 can generally be any flexible material such as a polymer, e.g., thermoplastic, amorphous, etc., which acts as a barrier to water and is capable of undergoing heat fusion with a nonwoven fiber layer. Examples of specific flexible polymers include chlorinated polyethylene, polyacrylate, polypropylene, polyurethane, with plasticized polyvinyl chloride or a copolymer thereof being preferred. The copolymer is derived from vinyl chloride monomers and small amounts of comonomers such as esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, or chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms; and mixtures of any of the above. The amount of the comonomer is generally up to about 30 percent by weight and desirably up to 20 percent by weight. Regardless of whether polyvinyl chloride homopolymer or copolymer is used, the inherent viscosity thereof according to ASTM-D-1240-60, Method A, in cyclohexane at 20° C., is generally from about 0.85 to about 1.10, and preferably from about 0.90 to about 0.96.

When the flexible material layer is a polymer, it can contain conventional additives in conventional amounts, such as processing aids, mildew-resistant compounds, light and heat processing stabilizers such as epoxidized soybean oil, lubricants such as stearic acid, flame retardants, pigments, and the like.

When the flexible layer is the preferred homopolymer of vinyl chloride or a copolymer thereof, it is an important aspect of the present invention that less than conventional amounts of plasticizer be utilized in order to obtain desirable physical properties such as good hydrostatic pressure resistance. Examples of various conventional plasticizers include various di and triesters, for example, phthalate esters which are preferred, such as dioctyl phthalate, butyl benzyl phthalate, diisononyl phthalate, or diisodecyl phthalate; various terephthalate esters, e.g., 1,4-benzenedicarboxylates; and various trimellitates, for example, 1,2,4-benzenetricarboxylates. Other plasticizers include various epoxidized vegetable oils and fatty acids such as epoxidized soybean oil, and the like, as well as various phosphate esters such as tricresyl phosphate, and tritolyl phosphate. Still other plasticizers include various adipates, azelates, oleates and sebacates, various glycol derivatives, and the like. Exemplary plasticizers are set forth in *The Technology of Plasticizers*, by Sears and Darby, pages 893–1085, John Wiley and Sons, New York, N.Y., 1982, which is hereby fully incorporated by reference. The amount of plasticizer is generally 70 or 65 parts or less, desirably from about 35 to about 60 parts, and preferably from about 45 to about 55 parts by weight per 100 parts by weight of the flexible polymer such as the vinyl chloride homopolymer or copolymer resin.

Although different polymers can be utilized with respect to each flexible layer, for example, layers 12 and 14, they are generally the same and similarly, while the thicknesses of the two or more polymer layers can vary with respect to each other, they are also generally the same. A suitable thickness of the top and bottom flexible layers 12 and 14 are generally from about 5 to about 50 mils, (from about 0.127 to about 1.27 millimeters) desirably from about 7 to about 25 mils (from about 0.177 to about 0.632 millimeters), and preferably from about 8.0 to about 22 mils (from about 0.203 to about 0.559 millimeters).

As seen in FIG. 1, flexible layers 12 and 14 which initially are binder-free are adhered together through the use of a flexible adhesive 16 and form intermediate composite or core 11. Adhesive 16 can generally be any suitable adhesive which provides good adherence of adjacent layers 12 and 14 so that the core has good peel resistance and is also water-resistant. Examples of suitable adhesives include various acrylic adhesives, various urethane adhesives, and the like. A preferred liquid adhesive is a plastisol which is a liquid composition containing a dispersion of small sized solid polyvinyl chloride particles or copolymers thereof in a plasticizer. More specifically, it can be defined as a liquid suspension of a non-porous emulsion grade polyvinyl chloride or copolymer thereof in a plasticizer. The particle size of the polyvinyl chloride or copolymer thereof is generally from about 0.075 to about 1.5, desirably from about 0.1 to about 1.3, and preferably from about 0.5 to about 1.2 microns. In contrast, the plasticized polyvinyl chloride layers or sheet 12 and 14 are made from particles which are much larger in size, for example, at least 10, 25, or 50, and often at least 100 or 150 microns. The plasticizers which can be utilized include any of the above-noted plasticizers discussed with regard to the plasticized polyvinyl chloride. Desirable plasticizers include various phthalate plasticizers such as DOP, i.e., dioctyl phthalate, diisodecyl phthalate, and preferably BBP (butyl benzyl phthalate). Various epoxidized unsaturated vegetable oils can also be utilized such as epoxidized soybean oil. The amount of the plastisol plasticizer is large in comparison with the amount of plasticizer in the polyvinyl chloride sheets 12 or 14 inasmuch as a liquid is desired. Suitable amounts generally range from about 75 to about 150, desirably from about 85 to about 125, and preferably from about 90 to about 110 parts by weight per 100 parts by weight of the polymer such as the polyvinyl chloride polymer or copolymer. Since the plasticizer is substantially free of a solvent and/or water, that is, generally has less than 5 parts by weight, desirably less than 2 parts by weight, and preferably nil, that is, no solvent and/or water, per 100 parts by weight of the flexible polymer, e.g., polyvinyl chloride polymer or copolymer thereof, it is non-volatile (e.g., at a temperature of approximately 50° C. for one hour at one atmosphere). The plastisol can be applied in any manner to either one or both of the flexible layers.

As explained hereinbelow, preferably each flexible polymer layer has previously had a non-woven fiber layer physically bonded to the opposite side thereof. In order to adhere the flexible polymer layers together, the non-volatile plastisol located therebetween must be fused. Suitable fusing temperatures generally range from about 300° F. (149° C.) to about 410° F. (210° C.) while copolymers thereof can reduce the fusing temperature to about 255° F. (124° C.) to about 305° F. (152° C.). Upon fusing the plastisol, the resin particles swell with plasticizer and become a gel. Further heating fuses the ingredients into a homogeneous melt which becomes a continuous solid upon cooling. The thickness of the plastisol adhesive layer is very small, generally from about 0.5 to about 2 or 3 mils.

As apparent from FIG. 1, flexible top layer 12 has a non-woven fiber layer 22 physically bonded thereto and similarly, flexible bottom polymer layer 14 has a non-woven fiber layer 24 physically bonded thereto. Non-woven layers 22 and 24 can be different but desirably are the same. Physical bonding, that is, partial embedding of a non-woven fiber layer into the flexible polymer layer, is achieved through the application of pressure and heat. The process of physically laminating the two layers together involves pressing the two layers or sheets together as through the use of a calender roll or other appropriate laminating apparatus at a pressure of from about 125 to about 450 (from about 2,232 to about 8,036) desirably from about 135 to about 350 (from about 2,411 to 6,250), and preferably from about 150 to about 200 pounds per linear inch (from about 2,679 to about 3,572 kilograms per linear meter) with the calender rolls being heated to a temperature of from about 280° F. to about 350° F. (from about 138° C. to about 177° C.), desirably from about 300° F. to about 335° F. (from about 149° C. to about 168° C.), and preferably from about 300° F. to about 320° F. (from about 149° C. to about 160° C.). The flexible material such as a polymer and/or the nonwoven layer can optionally be preheated to approximately the same temperatures. Such temperatures are generally above the softening point of the flexible material, e.g., a polymer, but below the melting point thereof.

An alternate laminating method contemplates extruding the flexible material and subsequently running it through a nip roll with the nonwoven layer. Generally, the flexible material or polymer fed to the laminating apparatus exists at an elevated temperature as from about 270° F. to about 350° F. (from about 132° C. to about 177° C.) inasmuch as it is usually fed directly from a Banbury or an extruder, etc., to the laminating apparatus and is soft.

Regardless of the particular type of laminating apparatus utilized, the nonwoven layer is partially pressed into the soft, flexible material and is physically bonded thereto; that is, no chemical bond such as would be generated by a chemical reaction, exists. Neither is a separate adhesive used. It is important that the nonwoven layer be only partially embedded in the flexible polymer layer so that the remaining portion thereof still possesses outward protruding fibers, and can form an effective bond, i.e., be mechanically bonded, or a rough surface to better form a chemical bond, to a masonry bonding material. The amount of fibers embedded within the flexible layers 12 and 14 is generally from about 20 percent to about 80 percent, desirably from about 30 percent to about 70 percent, and preferably from about 40 to about 60 percent by volume of the total volume of fibers utilized.

Nonwoven fiber layers 22 and 24 can be generally any type of synthetic nonwoven material with specific examples including polypropylene, polyester, acrylic, and nylon, and the like, with polyester such as polyethylene phthalate being preferred. The thickness of the nonwoven layer is generally from about 1 to about 8 mils (from about 0.025 to about 0.202 millimeters), desirably from about 3 to about 5 mils (from 0.076 to about 0.127 millimeters), with from about 4 to about 5 mils (from about 0.102 to about 0.127 millimeters) being preferred.

While a suitable membrane or laminate 10 has been shown in FIG. 1 wherein core or core layer composite 11 is formed by plastisol adhesive 16 bonding flexible polymer layers 12 and 14 together, it is to be understood that multiple, i.e., three or more flexible layers can be bonded together by a flexible adhesive such as a polyvinyl chloride plastisol. Thus, three separate flexible adhesive layers can be bound together by two flexible adhesive layers therebetween, four flexible layers can be bound together by three flexible adhesive layers therebetween, etc. However, each flexible polymer layer is free of multiple sheets of polymers, and has only a single sheet of polymer therein. That is, it is not composed of multiple sheets of polymers fused together as through dual lamination, fusing, and the like inasmuch as the same is not as strong as the flexible adhesive layer therebetween.

Figure 2:
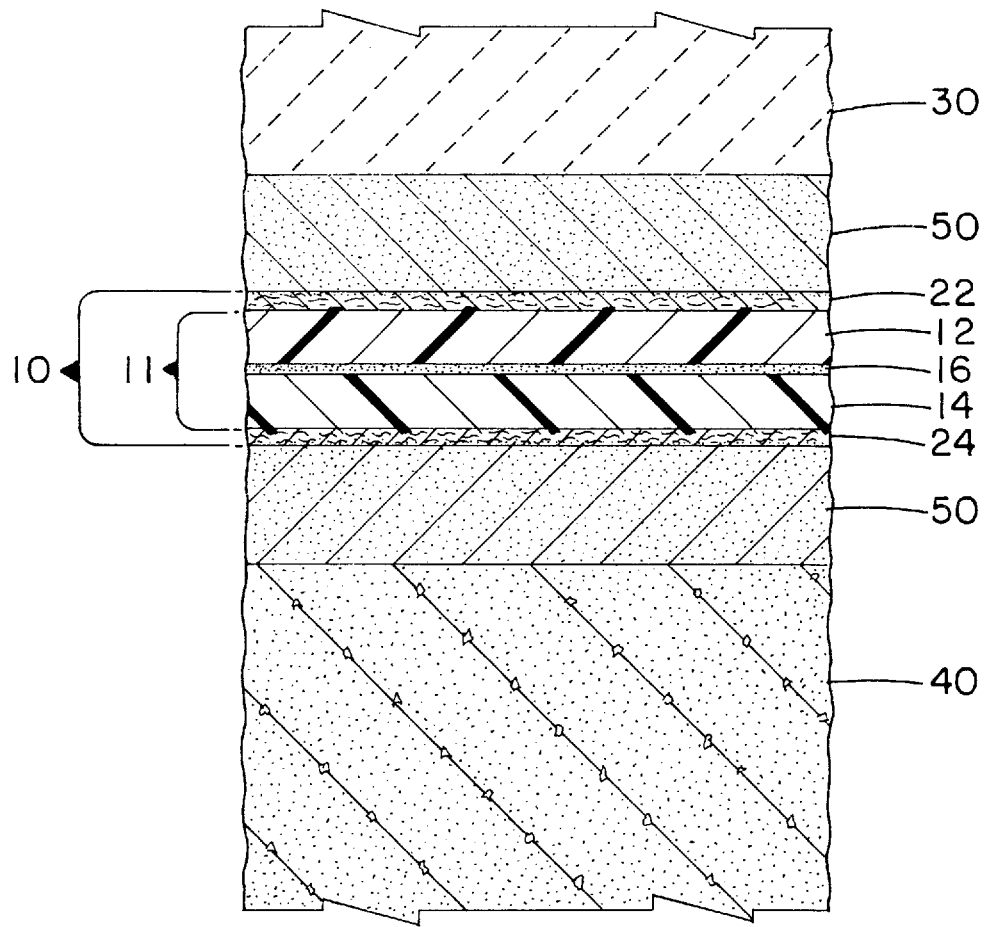
FIG. 2 is a cross-sectional view showing a ceramic tile bonded to a concrete substrate utilizing the membrane of the present invention.

FIG. 2 shows laminate 10 of the present invention used as an anti-fracture, water-resistant membrane in a masonry environment or construction. Specifically, exterior article 30 is indirectly bonded via laminate 10 of the present invention to a masonry substrate 40. The exterior article 30 is generally a thin-set article of masonry construction, that is, brick, ceramic tile, marble, stone, or the like. The exterior article 30 is typically bonded to the membrane or laminate through the use of a masonry bonding material 50 such as mortar, cement, or the like. Due to the fact that nonwoven fiber layer 22 is physically bonded and thus partially embedded in flexible polymer layer 12, but still has a substantial portion thereof residing upon the surface of the polymer layer so as to present outwardly protruding fibers or a rough surface, a strong bond is formed between the laminate and the masonry bonding material. Such a bond generally is free of any delamination of nonwoven layer 22. Similarly, the remaining nonwoven layer 24 is bonded through the use of a masonry bonding material 50 to masonry substrate 40 which can be concrete, stone, or the like. The net result is a flexible membrane or laminate inner liner which provides good water resistance or impermeability to the exterior article of the masonry construction, as well as water burst resistance and, more importantly, effective crack propagation resistance. That is, should substrate 40 crack due to settling etc., the flexible membrane 10 will absorb the stress and/or strain created by the height and/or width and significantly retard, if not eliminate, the same from extending to the exterior masonry article such as a ceramic tile.

The laminate of the present invention has a hydrostatic or water burst resistance of at least 100 pounds per square inch (6.894×10$^5$ newtons/square meter), a 150 percent modulus of from about 1,200 to about 1,800 or 2,000 pounds per square inch (from about 82.728×10$^5$ to about 137.88×10$^5$ newtons/square meter) and desirably from about 1,400 to about 1,600 psi (from about 96.516×10$^5$ to about 110.304× 10$^5$ newtons/square meter).

The present invention is suitable for use in shopping centers and malls, patios, basement floors, cementious backer boards, and the like, that is wherever thin-set exterior masonry articles such as ceramic tiles, marble, etc., are to be applied via an anti-fracture, water-resistant membrane to a masonry substrate.

An important aspect of the present invention is that the membrane or laminate 10 does not delaminate, especially during use. Delamination generally results in a bubble being formed in the membrane which during use and stress as caused by walking thereon can result in ceramic tile 30 breaking or cracking. The flexible adhesive laminate of the present invention has been found to have unexpected improvement in peel strength, especially low temperature peel strength. Generally, the laminates of the present invention have a room temperature, i.e., 70° F. (21° C.) peel strength of at least 7, desirably at least 8 or 10, and preferably at least 12 pounds per inch. The peel strength at high temperatures, e.g., 125° F. (52° C.) is at least 3, desirably at least 5 or 6, preferably at least 7 pounds per inch. Dramatic low temperature peel strengths were achieved inasmuch as at 0° F. (−18° C.) peel strengths of at least 2 or 3, desirably at least 5 or 6, preferably at least 9, 12, or 15, and more preferably at least 18, 21, and even 24 pounds per inch were achieved!

The invention will be better understood and appreciated by reference to the following examples which serve to illustrate, but not to limit the invention.

EXAMPLES

Two separate but essentially identical nonwoven polyester layers were physically bonded to a flexible polyvinyl chloride layer containing 51 parts by weight of a phthalate plasticizer therein per 100 parts by weight of the polyvinyl chloride by calendering the two components together at a temperature of about 310° F. (154° C.) at a pressure of about 180 lbs per linear inch 3,215 kilograms per linear meter). A plastisol adhesive as described hereinbelow was applied to one polyvinyl chloride sheet by Rotogravure in an amount of approximately ½ ounce to 1 ounce per square yard of the PVC material. The laminate was then formed by heating the plastisol to a fusing temperature of approximately 360° F. (182° C.). The solventless, waterless plastisol contained approximately 100 parts by weight of butylbenzyl phthalate plasticizer for every 100 parts by weight of Geon polyvinyl chloride resin 121A. This resin is a polyvinyl chloride homopolymer having an average particle size of 1 micron plus or minus 20 percent. The plastisol also contained three parts by weight of a barium/cadmium/zinc stabilizer per 100 parts by weight of the polyvinyl chloride resin. The thickness of each polyvinyl chloride layer was about 15 mils and the thickness of the plastisol adhesive layer was about 0.5 to 1.5 mils.

The hydrostatic pressure resistance of the laminate was in excess of 100 psi. The laminate was then tested for peel strength at room temperature, high temperature, i.e., 125° F. and a low temperature of 0° F., and the results set forth in Table I.

Substantially similar if not identical laminates were made wherein a polyester non-woven fiber layer was physically bonded to a polyvinyl chloride homopolymer containing 50 parts by weight of a phthalate plasticizer therein, e.g., dioctyl phthalate. Two of said polyester physically bonded polyvinyl sheets where then dual laminated (i.e., no flexible adhesive or plastisol) in accordance with U.S. Pat. No. 5,318,832. This laminate was also tested for peel strength at room temperature, high temperature, and low temperature, and the results thereof set forth in Table I as Example A. Also set forth in Table I as a control, i.e., Example B, is an improved peel strength adhesion laminate of U.S. Pat. No. 5,318,832 which was made in substantially an identical manner as Example A, except that the time of the dual lamination step was increased.

As apparent from Table I, Control A yielded a room temperature peel strength of only 3.5 pounds per inch whereas the improved control, Example B, yielded peel strength of 10 pounds per inch. In contrast, the laminate of the present invention had a peel strength of 12 pounds per inch. With regard to high temperature, Control A had very poor peel strength, i.e., only 1 pound per inch whereas the improved control had a noticeably improved peel strength of 6 pounds per inch. The present invention achieved a high temperature peel strength of 7 pounds per inch. With regard to low temperature peel strength, both Control A and improved Control B had a negligible peel strength, that is, zero pounds per inch. In contrast to the essential lack of any peel strength at 0° F. of the controls, the present invention had an unexpected peel strength of 24 lbs per inch! Low temperature peel strength is very important inasmuch as many construction installations will be made at low temperature, for example (no heat within a building) and thus if delamination occurs, the membrane is not suitable.

TABLE I

PEEL STRENGTH TEST DATA

| Temperature | Example A (U.S. Pat. No. 5,318,832) | Example B (Improved U.S. Pat. No. 5,318,832) | Example C (Invention) |
|---|---|---|---|
| Room Temperature, i.e., 70° F. (21° C.) | 3.5 lbs/inch | 10 lbs/inch | 12 lbs/inch |
| High Temperature- 125° F. (52° C.) | 1 lb/inch | 6 lbs/inch | 7 lbs/inch |
| Low Temperature 0° F. (–18° C.) | 0 lbs/inch | 0 lbs/inch | 24 lbs/inch |

While in accordance with the Patent Statutes, the best mode and preferred embodiment has been set forth, the scope of the invention is not limited thereto, but rather by the scope of the attached claims.

What is claimed is:

1. An anti-fracture, water-resistant, masonry-bondable membrane, comprising:
a laminate having a core comprising two layers of a flexible material bonded together by a flexible adhesive derived from a liquid plastisol, a first non-woven fiber layer physically bonded directly to one side of said core, and wherein said core has a low temperature peel strength of at least 2 pounds per inch at 0° F.

2. An anti-fracture, water-resistant, masonry-bondable membrane according to claim 1, wherein said flexible material is chlorinated polyethylene, polyacrylate, polypropylene, polyurethane, plasticized polyvinyl chloride or a copolymer thereof, and wherein said low temperature peel strength is at least 6 pounds per inch.

3. An anti-fracture, water-resistant, masonry-bondable membrane according to claim 2, wherein a second non-woven fiber layer is physically bonded directly to the other side of said core, wherein said flexible material is said plasticized polyvinyl chloride or copolymer thereof, and wherein said low peel strength temperature is 0° F.

4. An anti-fracture, water-resistant, masonry-bondable membrane according to claim 3, wherein the amount of plasticizer in said polyvinyl chloride polymer or copolymer is from about 35 to about 70 parts by weight per 100 parts by weight of said polyvinyl chloride polymer or copolymer, wherein said liquid plastisol contains from about 75 to about 150 parts by weight of a plasticizer per 100 parts by weight of polyvinyl chloride polymer or copolymer particles, and wherein said nonwoven fiber layer comprises polyester fibers.

5. An anti-fracture, water-resistant, masonry-bondable membrane according to claim 4, wherein said low temperature peel strength is at least 12 pounds per inch at 0° F.

6. A masonry, anti-fracture water-resistant construction, comprising;
a laminate having a core comprising two sheets of a flexible material bonded together by a flexible adhesive derived from a liquid plastisol, and a first non-woven fiber layer physically bonded directly to one side of said core and a second non-woven fiber layer physically bonded directly to the other side of said core, said laminate bonded with a bonding material on one side to a masonry exterior article and bonded with a bonding material on the remaining side to a masonry substrate, and said core having a low temperature peel strength of at least 2 pounds per inch at 0° F.

7. A masonry anti-fracture water-resistant, construction according to claim 6, wherein said flexible material is chlorinated polyethylene, polyacrylate, polypropylene, polyurethane, plasticized polyvinyl chloride or a copolymer thereof, and wherein said core has a peel strength between said two sheets of flexible material of at least 6 pounds per inch at 0° F.

8. A masonry anti-fracture water-resistant, construction according to claim 7, wherein said flexible material is plasticized polyvinyl chloride or a copolymer thereof, wherein said liquid plastisol contains from about 75 to about 150 parts by weight of a plasticizer per 100 parts by weight of polyvinyl chloride polymer or copolymer particles, and wherein said non-woven fiber layer comprises polyester fibers.

9. A masonry anti-fracture water-resistant, construction according to claim 8, wherein said core has a peel strength between said two sheets of flexible material of at least 12 pounds per inch at 0° F.

10. A method of making an anti-fracture, water-resistant, masonry-bondable membrane, comprising the steps of;
applying a non-woven fiber layer to one side of a flexible polymer layer,
physically bonding said non-woven fiber layer to said one side of said flexible polymer layer, and
adhering the non-woven side of said physically bonded non-woven polymer layer to the non-woven side of another physically bonded non-woven polymer layer by a flexible adhesive derived from a liquid plastisol, the low temperature peel strength between said adhered flexible polymer layers being at least 2 pounds per inch at 0° F.

11. A method according to claim 10, including heating said flexible adhesive.

12. A method according to claim 11, wherein each said flexible polymer layer is chlorinated polyethylene, polyacrylate, polypropylene, polyurethane, plasticized polyvinyl chloride or a copolymer thereof, wherein said liquid plastisol contains a plasticizer and polyvinyl chloride polymer or copolymer particles, and wherein said peel strength is at least 6 pounds per inch at 0° F.

13. A method according to claim 12, wherein said flexible polymer layer is said plasticized polyvinyl chloride or a copolymer thereof, including conducting said physical bonding at a temperature above the softening point but below the melting point of said polyvinyl chloride or copolymer flexible polymer layer, and wherein said peel strength is at least 9 pounds per inch.

14. An anti-fracture, water-resistant, masonry-bondable membrane, comprising;
a laminate having a core comprising two layers of a flexible material bonded together by a flexible adhesive derived from a liquid plastisol, said flexible material being plasticized polyvinyl chloride, or a copolymer thereof, the amount of said plasticizer in said polyvinyl chloride or said copolymer being from about 35 to about 70 parts by weight per 100 parts by weight of said polyvinyl chloride polymer or said copolymer, said plastisol containing polyvinyl chloride polymer or copolymer particles having a size of from about 0.075 to about 1.5 microns, said liquid plastisol containing from about 75 to about 150 parts by weight of a plasticizer per 100 parts by weight of said polyvinyl chloride polymer or copolymer particles, and
a first non-woven fiber layer physically bonded directly to one side of said core and a second non-woven fiber layer physically bonded directly to the other side of said core, said non-woven fiber layer comprising polyester fibers, said core having a low temperature peel strength of at least 6 pounds per inch at 0° F.

15. A masonry, anti-fracture water-resistant construction, comprising;

a laminate having a core comprising two sheets of a flexible material bonded together by a flexible adhesive derived from a liquid plastisol, said core having a low temperature peel strength of at least 2 pounds per inch at 0° F., said flexible material being plasticized polyvinyl chloride or a copolymer thereof, said liquid plastisol containing from about 75 to about 150 parts by weight of a plasticizer per 100 parts by weight of a polyvinyl chloride polymer or copolymer, the particle size of said liquid plastisol polyvinyl chloride polymer or copolymer being from about 0.075 to about 1.5 microns, and a first non-woven fiber layer physically bonded directly to one side of said core and a second non-woven fiber layer physically bonded directly to the other side of said core, said laminate bonded with a bonding material on one side to a masonry exterior article and bonded with a bonding material on a remaining side to a masonry substrate, said non-woven fiber comprising polyester fibers.

16. An anti-fracture, water-resistant, masonry-bondable membrane, comprising:

a laminate having a core comprising two layers of a polymeric flexible material in the form of a water barrier film bonded together by a layer of from about 0.5 mil to about 3 mils of a continuous solid flexible adhesive derived from a liquid plastisol, and a non-woven fiber layer physically bonded directly to one side of said core, and wherein said core has a low temperature peel strength of at least 2 pounds per inch at 0° F.

17. A masonry, anti-fracture water-resistant construction, comprising:

a laminate having a core comprising two sheets of a polymeric flexible material in the form of a water barrier film bonded together by a fused flexible adhesive derived from a liquid plastisol, and a non-woven fiber layer physically bonded directly to one side of said core, said laminate bonded with a bonding material on one side to a masonry exterior article and bonded with a bonding material on the remaining side to a masonry substrate, and wherein said core has a low temperature peel strength of at least 2 sounds per inch at 0° F.

18. A method of making an anti-fracture, water-resistant, masonry bondable membrane, comprising the steps of;

applying a non-woven fiber layer to one side of a flexible polymer layer;

physically bonding said non-woven fiber layer to said one side of said flexible polymer layer; and adhering the remaining side of said physically bonded non-woven polymer layer to the remaining side of another physically bonded non-woven polymer layer by a flexible adhesive derived from a liquid plastisol, and wherein the low temperature peel strength between said adhered polymer layers is at least 2 pounds per inch at 0° F.

* * * * *